US012673426B2

(12) United States Patent     (10) Patent No.:   US 12,673,426 B2

Ferre     (45) Date of Patent:     Jul. 7, 2026

(54) PALLETISATION FACILITY

(71) Applicant: SIDEL PARTICIPATIONS, Octeville-sur-Mer (FR)

(72) Inventor: Laurent Ferre, Saint-Laurent-sur-Sevre (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 18/878,199

(22) PCT Filed: Jul. 6, 2023

(86) PCT No.: PCT/EP2023/068720

§ 371 (c)(1),
(2) Date: Dec. 23, 2024

(87) PCT Pub. No.: WO2024/008870

PCT Pub. Date: Jan. 11, 2024

(65) Prior Publication Data

US 2025/0381674 A1     Dec. 18, 2025

(30) Foreign Application Priority Data

Jul. 6, 2022    (FR) ................................. FR2206879

(51) Int. Cl.
    *B25J 9/16*         (2006.01)
    *B65G 61/00*       (2006.01)

(52) U.S. Cl.
    CPC ........... *B25J 9/1687* (2013.01); *B25J 9/1674* (2013.01); *B65G 61/00* (2013.01)

(58) Field of Classification Search
CPC ........ B25J 9/1687; B25J 9/1674; B25J 19/06; B65G 61/00; E06B 9/11; E06B 9/15; E06B 2009/1505; E06B 2009/1527; F16P 1/00

See application file for complete search history.

(56) References Cited

U.S. PATENT DOCUMENTS 2,621,726 A * 12/1952 Greegor .................... E06B 9/17
                                        160/180
3,330,611 A * 7/1967 Heifetz ................... E06B 9/115
                                        312/297

(Continued)

FOREIGN PATENT DOCUMENTS

DE      102012108716 A1    3/2014
DE      102013111570 A1    4/2015

(Continued)

OTHER PUBLICATIONS

International Search Report and Written Opinion for PCT /EP2023/ 068720 Dated Oct. 6, 2023.

*Primary Examiner* — Gregory W Adams

(57) ABSTRACT

Described is a facility for palletising products and a method for palletising products. The facility has a pick area for picking up the products, and two place areas for placing products on pallets. The facility includes a work station situated between the two place areas and the facility includes a separating wall that moves between a first position between the work station and the first place area, and a second position between the work station and the second place area, so as to alternately separate one of the two place areas from the work station.

8 Claims, 4 Drawing Sheets

(56)          References Cited

U.S. PATENT DOCUMENTS

|  |  |  |  |  |
|---|---|---|---|---|
| 4,432,591 | A * | 2/1984 | Rinkewich | E06B 9/15 |
|  |  |  |  | 312/297 |
| 7,030,363 | B2 * | 4/2006 | Watanabe | F16P 3/144 |
|  |  |  |  | 340/552 |
| 8,371,797 | B2 * | 2/2013 | Bonhomme | B65G 59/00 |
|  |  |  |  | 74/612 |
| 9,030,674 | B2 * | 5/2015 | Bonin | B25J 9/1676 |
|  |  |  |  | 700/250 |
| 9,158,299 | B2 * | 10/2015 | Kouno | B25J 9/0084 |
| 9,737,992 | B2 * | 8/2017 | Mougin | B25J 9/1676 |
| 10,392,203 | B2 * | 8/2019 | Saylor | B65G 57/03 |
| 10,836,035 | B2 * | 11/2020 | Sawada | B25J 19/06 |
| 10,947,061 | B2 * | 3/2021 | Usami | B25J 9/0093 |
| 2004/0089793 | A1 * | 5/2004 | Watanabe | F16P 3/144 |
|  |  |  |  | 250/221 |
| 2020/0254631 | A1 * | 8/2020 | Sawada | B25J 19/06 |
| 2021/0245972 | A1 * | 8/2021 | Ackermann | B25J 15/0253 |
| 2022/0234844 | A1 * | 7/2022 | Loza | F16P 1/02 |

FOREIGN PATENT DOCUMENTS

|  |  |  |  |  |  |
|---|---|---|---|---|---|
| DE | 102015208222 | B3 * | 9/2016 | | F16P 3/02 |
| WO | 2009050374 | A2 | 4/2009 | | |
| WO | WO-2012010140 | A2 * | 1/2012 | | B25J 19/06 |
| WO | WO-2019240271 | A1 * | 12/2019 | | B65G 61/00 |

* cited by examiner

PALLETISATION FACILITY

CROSS-REFERENCE TO RELATED APPLICATIONS

This application is a 371 U.S. National Stage Application of PCT Application Serial Number PCT/EP/2023/068720 filed on Jul. 6, 2023, which application claims the benefit of and priority to French Application No. FR2206879, filed Jul. 6, 2022, the entire contents of each of which are hereby incorporated herein by reference.

The invention relates to the field of palletizing products on an industrial line. More particularly, it relates to a robotic palletization facility having two depositing zones, i.e. two separate palletizing zones. In the context of the invention, each of the zones is isolated alternately to allow an operator to access the previously secured depositing zone. It also relates to a palletizing method comprising a step consisting of isolating and thus securing a palletizing zone to allow the palletizing in the other zone to start and/or continue.

In this type of facility, a workstation typically comprises a robot that picks products from a picking zone and deposits them in either one of the depositing zones. In other words, a robot picks products and stacks them on a pallet, positioned in a depositing zone.

It is essential to restrict access to the facility even though the workstation is in operation, to guarantee the safety of the operators present.

PRIOR ART

In this type of facility, closed enclosures fitted with doors are usually used. In this case, the operator has to stop the workstation before collecting the finished pallet loaded with products.

Solutions consisting of securing access to the facility, notably by using sensors, such as motion detectors, or sensors for detecting the height of the products on a pallet, are known from the prior art.

There are also solutions that facilitate the unaided removal of the pallet. In this case, the operator does not need to access the facility.

TECHNICAL BACKGROUND

Document FR2987774 proposes a solution intended to prevent access to the facility when it is in operation, the facility itself being completely secured by an enclosure. If the door of the enclosure is opened, a signal is sent to the sensor, and the robot stops work completely.

Document U.S. Pat. No. 10,843,340 describes a system of detection sensors, which cause the palletizing robot to slow down or stop if an operator is located in the vicinity of the latter.

Document DE 102013111570 describes a solution intended to modify the configuration of two depositing zones to modify the surface area of each one and to secure them alternately.

SUMMARY OF THE INVENTION

The solutions proposed in the prior art are somewhat unsatisfactory because the facility has to be slowed or even stopped to allow the operator to move around in the vicinity of the working robot to collect the finished pallet. This leads to production losses on the industrial line. There is therefore a need for a safe and more productive palletization facility, in which the workstation can continue to operate even if there is an operator nearby, notably when the operator is collecting the finished pallet or returning an empty pallet to one of the depositing zones.

To this end, the invention relates to a facility for palletizing products, said facility having a picking zone for said products, two zones for depositing products on pallets, said facility comprising a workstation located between the two depositing zones.

The facility is characterized in that it comprises a separating wall that is moveable between at least two positions: a first position between said workstation and the first depositing zone and a second position between said workstation and the second depositing zone, so as to alternately separate one of the two depositing zones from said workstation.

According to a possible variant, the facility comprises an enclosure surrounding the picking zone, the workstation and the depositing zones, said enclosure having an entrance for each depositing zone and an opening for supplying the picking zone.

In some embodiments, the workstation of the facility comprises a robot provided with gripping means, said gripping means picking the products from said picking zone and discharging them into one of the depositing zones.

According to a possible feature, the workstation comprises a structure having a lower face, an upper face and two side faces, the robot being fastened directly or indirectly to said structure and the separating wall being movable along said structure.

Advantageously, the structure is configured to receive the robot in a folded position and comprises guide rails for the separating wall, said rails extending over the upper face of said structure above the robot and along the side faces so that, when said robot is in the folded position, said separating wall can be moved along said rails between the first position and the second position.

In some embodiments, the facility comprises detection means for determining the filling level of a pallet and triggering the folding of the robot into the structure and the movement of the separating wall from one position to another.

According to another possible feature, the facility comprises safety sensors which detect the presence of the separating wall in the first position and in the second position.

In some embodiments, the separating wall is a curtain.

According to a possible variant, the curtain comprises slats.

Advantageously, the curtain comprises at least one transparent slat.

The invention also relates to a palletizing method for a facility having a picking zone and two depositing zones, said method comprising the following steps first picking products to be palletized from a picking zone, executed by a workstation, then unloading said products onto a pallet.

The palletizing method is characterized in that it comprises a step of moving a separating wall from a first depositing zone when a first pallet located in said first zone reaches a predetermined filling level, to enable products to be deposited on a second pallet located in a second depositing zone.

Advantageously, the step of picking and unloading the products is carried out using gripping means of a robot of said workstation. Thus, in some embodiments, the palletizing method comprises the following steps: first picking products to be palletized from a picking zone, executed by gripping means of a robot, then unloading said products onto a pallet.

According to a possible variant, the palletization in the second zone only starts once a signal relating to the correct positioning of the separating wall has been triggered.

The invention also relates to the palletization facility implementing the method.

BRIEF DESCRIPTION OF THE FIGURES

The invention will be better understood thanks to the description below, which is based on possible embodiments, explained in an illustrative and non-limiting way, with reference to the appended figures, in which.

DETAILED DESCRIPTION OF THE INVENTION

In the remainder of the description, elements that have the same structure or similar functions are denoted using the same reference signs.

Figures 1, 2:
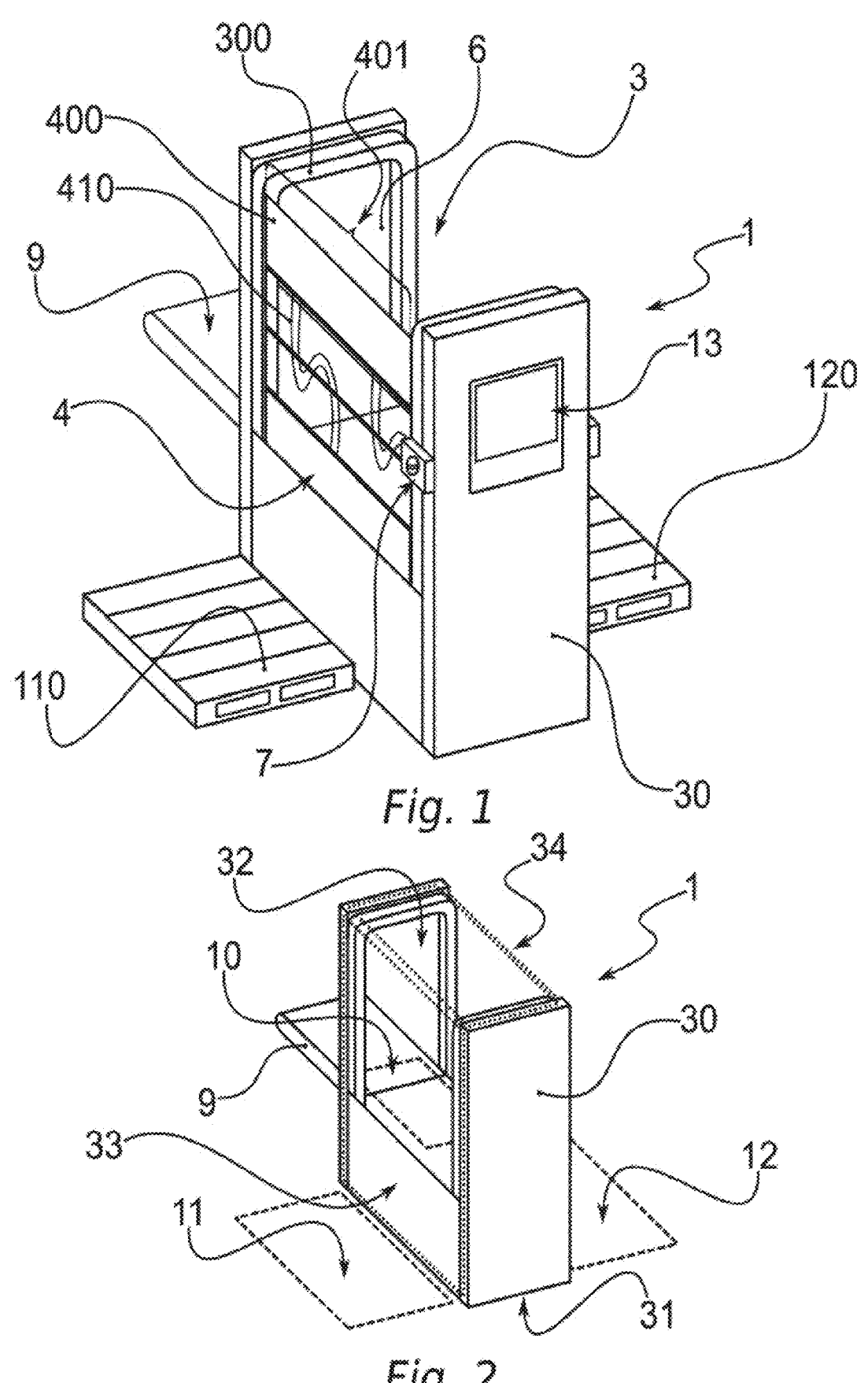
FIG. 1 is a schematic perspective view of a first embodiment of a palletization facility.
FIG. 2 is a simplified schematic perspective view of the first embodiment, notably highlighting different zones and faces of said facility.

The invention therefore relates to a facility 1 for palletizing products 2. The products 2 can be of different types: containers, cans, closed cardboard boxes, open crates, trays, etc. The products 2 can be provided individually or in batches. FIG. 1 is a schematic perspective view of the palletization facility 1 according to a first embodiment. As shown in FIG. 2, the facility 1 has a picking zone 10 for picking the products 2 and two depositing zones 11, 12 for depositing said products 2. The products 2 arrive at the picking zone 10, for example via a feed conveyor 9. They are then processed by means of a workstation 3, said workstation 3 being located between the two depositing zones 11, 12. This enables the workstation 3 to deposit the products 2 on a pallet 110, 120 located in one of the depositing zones 11, 12.

The workstation 3 therefore carries out the actions of loading, picking the products 2, and unloading said products 2 onto a pallet 110, 120.

As shown in FIG. 1; the facility comprises a movable separating wall 4, making it possible to alternately secure one depositing zone 11, 12. The workstation 3 can first fill a first pallet 110 in a first depositing zone 11 and then, once said first pallet 110 is filled, or when it has reached the desired filling level, deposit the products 2 on a second pallet 120 located in a second depositing zone 12. The workstation 3 may also constitute pallets 110, 120 loaded with different products 2, the safety wall 4 then moving from one position to the other.

The aim of the invention is to secure a depositing zone 11, 12. This ensures that an operator who is in the secured depositing zone has no physical interaction with the workstation 3. This obviates the need to prohibit access to the facility while said workstation 3 is in operation. To secure the depositing zone 11, 12 not being used by the workstation 3, the facility comprises a separating wall 4, which is movable between at least two positions. The separating wall 4 moves between a first position, between the workstation 3 and the first depositing zone 11, and a second position, between said workstation 3 and the second depositing zone 12. Thus, the wall 4 alternately separates one of the two depositing zones 11, 12 from the workstation 3. An operator can then perform actions in the isolated depositing zone 11, 12, even if the workstation 3 is in operation, i.e. while said workstation 3 is unloading products 2 in the other depositing zone.

The separating wall 4 may be made of any material, for example plastic. Said wall 4 may be flexible or rigid. Preferably, the material thereof is tear-resistant. According to one embodiment, the separating wall 4 is a curtain 40.

According to an additional feature, the curtain 40 comprises slats 400. In this embodiment, the slats 400 are horizontal and are very long 401. The ends 402 of said slats 400 are inserted into slideways formed by the rails 300 of the structure 30 so as to move from a first position to a second position.

According to yet another feature, the curtain 40 comprises at least one transparent slat 410.

In FIG. 1, the separating wall 4 is in a first position, to isolate the first depositing zone 11 from the workstation 3. The separating wall 4 therefore secures the first depositing zone 11 and the latter is accessible by an operator. In the embodiment illustrated in FIG. 1, the separating wall 4 takes the form of a curtain 40 constituted by slats 400. In particular, the curtain 40 comprises two transparent slats 410.

According to yet another possible feature, the workstation 3 comprises a structure 30. The structure 30 is illustrated in detail in FIG. 2 and forms a frame around and above said workstation 3. The structure 30 has a lower face 31, an upper face 32 and two side faces 33 and 34.

The lower face 31 preferably corresponds to the footprint of the workstation 3. In embodiments in which the workstation 3 comprises a robot 6, the lower face 31 corresponds to a footing on which the base 60 of said robot 6 is fastened. In particular, the base 60 of said robot 6 may be fastened directly or indirectly to the structure 30.

The side faces 33, 34 correspond respectively to the faces forming an opening into the depositing zones 11, 12 and therefore giving the workstation 3 access to the pallets 110, 120. In this embodiment, the separating wall 4 alternately closes one of the two side faces 33, 34 of the structure 30 to isolate the workstation 3 from the corresponding depositing zone 11, 12.

Figures 3, 4:
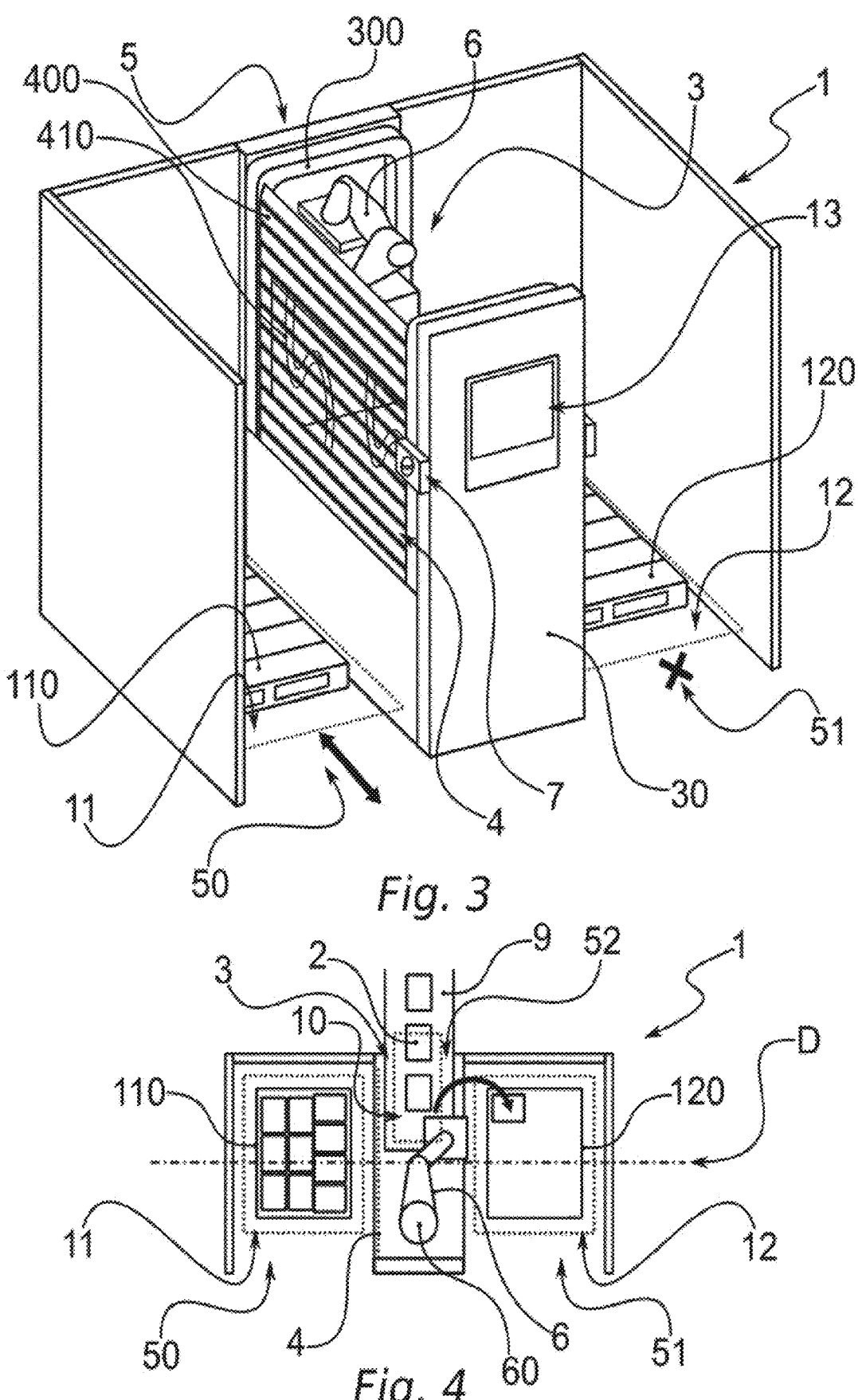
FIG. 3 is a schematic perspective view of a second embodiment of a palletization facility, notably showing an enclosure partially surrounding two depositing zones with the respective entrances thereof.
FIG. 4 is a schematic elevation view of the palletization facility, notably showing palletizing in progress.

According to a possible additional feature, and as shown in FIG. 3, the structure 30 comprises guide rails 300. Said rails 300 extend along the side faces 33, 34 and over the upper face 32. They then form slideways, or else a movement path for the separating wall 4. In other words, the wall 4 moves from a first position to a second position by traveling along the rails 300.

It is understood that the workstation 3 may comprise a structure 30, even if there is no robot 6. Similarly, the structure 30 may comprise guide rails 300 even if the workstation 3 does not comprise a robot 6.

According to a possible additional feature, the palletization facility 1 comprises an enclosure 5. As illustrated in FIG. 3, the enclosure 5 surrounds the picking zone 10, the workstation 3 and the depositing zones 11, 12. Each depositing zone 11, 12 then has an entrance 50, 51. The entrance may optionally comprise (not shown) closing means such as a door or a sliding panel. However, these additional closing means are not obligatory, the wall 4 fully securing the depositing zone 11, 12 with respect to the workstation 3.

Indeed, the products 2 to be palletized are processed by said workstation 3, which is physically isolated from the depositing zone 11, 12 which is not in use. The depositing zone 11, 12 which is not being used for palletizing is referred to as the accessible zone, and poses no danger to the operator, who can access it freely.

The depositing zone 11, 12 which is being used for palletizing forms a working zone with the picking zone 10 and the workstation 3.

According to another feature, the enclosure 5 also comprises an opening 52 to enable the picking zone 10 to be supplied with products 2. Notably, as illustrated in FIG. 4, it may be an opening 52 enabling one end of a feed conveyor 9 to pass through.

According to another embodiment, as shown in FIG. 3, the workstation 3 comprises a robot 6. The robot 6 comprises gripping means 61 which carry out the operations of loading and unloading the products 2.

The robot 6 is therefore used to pick the products 2 from the picking zone 10, and then to unload them in one of the two depositing zones 11, 12. The robot 6 and in particular the gripping means 61 therefore move between the different zones, from a picking zone to a depositing zone, in the working zone, from loading to unloading. It is essential to protect the present operators from this robot 6. To do so, the robot 6 comprises a base 60, said base 60 being located at the workstation 3, as shown notably in FIG. 5. The wall 4 thus physically separates the base 60 of the robot 6 in the workstation 3 from the depositing zone 11, 12 which is not being used for palletizing and which must therefore be accessible to an operator. The robot 6, which then forms an integral part of the workstation 3, can move in the working zone to process the products 2, while the depositing zone 11, 12 which is not being used for palletizing is physically protected from said robot 6. In other words, the separating wall 4 completely isolates one depositing zone 11, 12, enabling the operator to work therein in complete safety.

In fact, when the separating wall 4 is in the first or second position, the robot 6 and the gripping means 61 thereof move exclusively within the working zone formed by the workstation 3, the picking zone 10 and the depositing zone 11, 12 being used for palletizing. The separating wall 4 prevents the robot 6 and/or the gripping means 61 thereof from entering, even partially, the depositing zone 11, 12 that is not in use, referred to as the accessible zone. This allows the operator to access it safely.

According to an additional feature, the palletization facility 1 comprises a single separating wall 4.

FIG. 4 is an elevation view of the palletization facility. In particular and as shown, the workstation 3, by means of a robot 6, is palletizing the second pallet 120, in the second depositing zone 12. In this possible embodiment, the products 2 are brought on a feed conveyor 9 to a picking zone 10, passing through an opening 52. Said products 2 are then picked by a robot 6, then deposited on said second pallet 120. The first pallet 110, which is located in the first depositing zone 11, is loaded with products 2, and the filling thereof is complete. As shown, the separating wall 4 is located in the first position thereof, between the first depositing zone 11 and the workstation 3. Said first pallet 110 is then accessible with no danger, and an operator can collect said pallet 110 from a first depositing zone 11 while the workstation 3 is operating in a second depositing zone 12.

Figures 5, 6, 7:
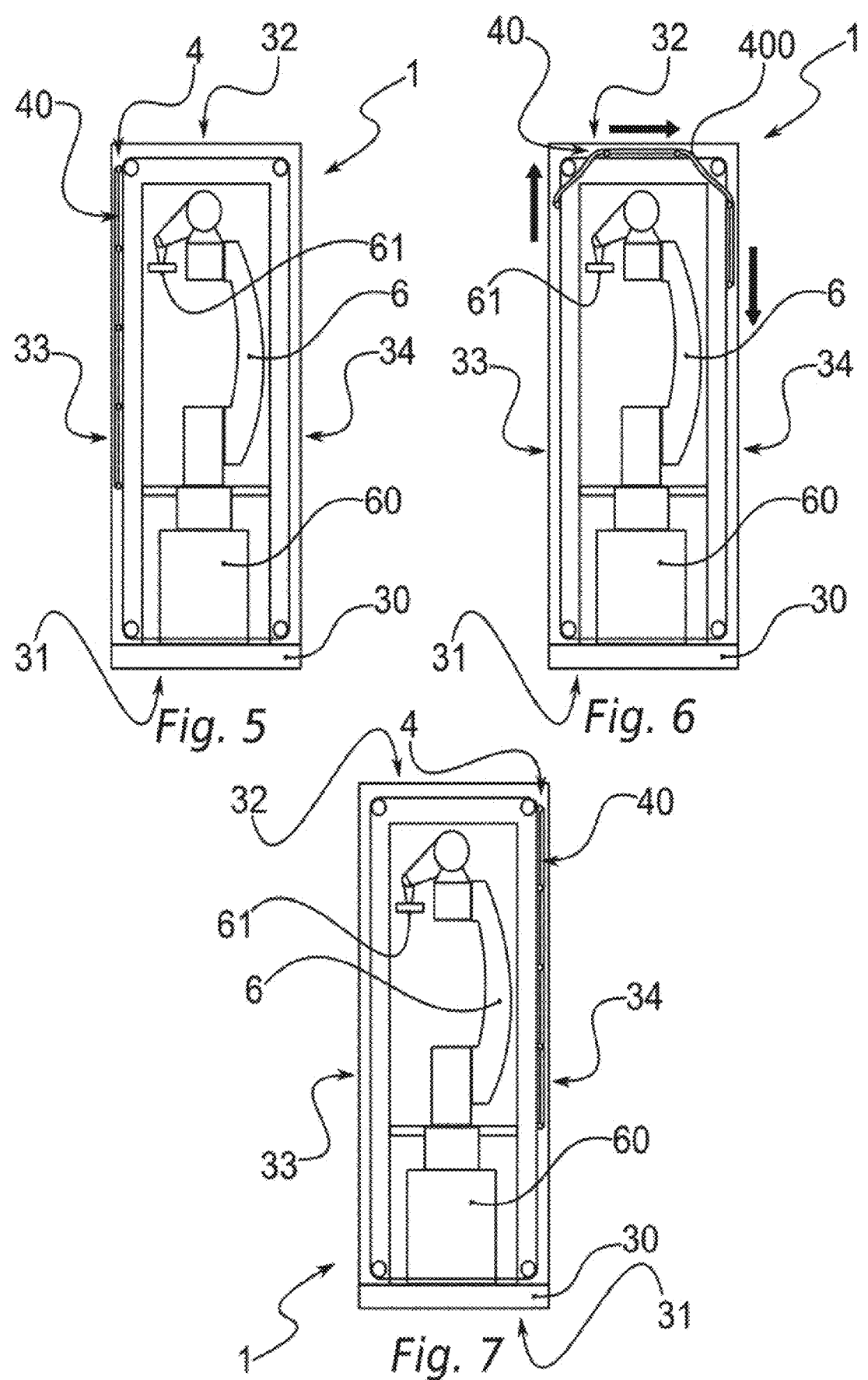
FIG. 5 is a simplified schematic view along a vertical section of an embodiment of the palletization facility, notably showing the separating wall in a first position.
FIG. 6 is a schematic view similar to FIG. 5, notably showing the separating wall moving along a path extending over the upper region.
FIG. 7 is a schematic view similar to FIG. 6, notably showing the separating wall in a second position.

The movement path of the safety wall 4 is illustrated in FIGS. 5 to 7. In FIG. 5, the safety wall 4 closes the side face 33 of the structure 30. In FIG. 6, the wall 4 travels across the upper face 32 to reach the second position in FIG. 7, in which said wall 4 closes the side face 34 of the structure 30. The workstation 3 is separated alternately from the first depositing zone 11 and then from the second depositing zone 12. It will be understood that the direction of movement of the wall 4 is then reversed.

The first position of the separating wall 4 may equally correspond to a closure of the side face 33 or of the side face 34. Conversely, the second position of the separating wall 4 may correspond equally to a closure of the side face 34 or of the side face 33.

According to one embodiment, and to optimize the dimensions of the structure 30 of said workstation 3, the separating wall 4 travels from one position to the other when the robot 6 is folded. In this configuration, visible in FIGS. 5 to 7, the robot 6 and the gripping means 61 thereof are folded under the upper face 32, to allow the passage of the separating wall 4, then the robot 6 and the gripping means 61 thereof are deployed once the wall 4 has passed the upper face 32, preferably when the separating wall 4 has completed the movement circuit thereof. Said wall 4 is then in a position separating the pallet for which filling has been completed, and therefore the depositing zone which is not or is no longer being used for palletizing by the workstation 3. This embodiment is particularly advantageous because it enables the height of the structure 30 and the dimensions of the separating wall 4 to be reduced.

According to an additional feature, the dimensions of the separating wall 4 correspond to the dimensions of a side face 33, 34, the two side faces 33, 34 being symmetrically opposite. Notably, this means that the workstation 3 is not constrained by the presence of the wall 4 when processing the products 2.

According to another variant, the dimensions of the separating wall 4 are substantially greater than the dimensions of the side faces 33, 34. Since the width of said separating wall 4 is determined by the width of the structure 30 and of the side faces 33, 34, the length thereof may however be greater than the height of said faces 33, 34. For example, the length of the wall 4 may be 5% to 10% greater than the height of the side faces 33, 34.

Figure 8:
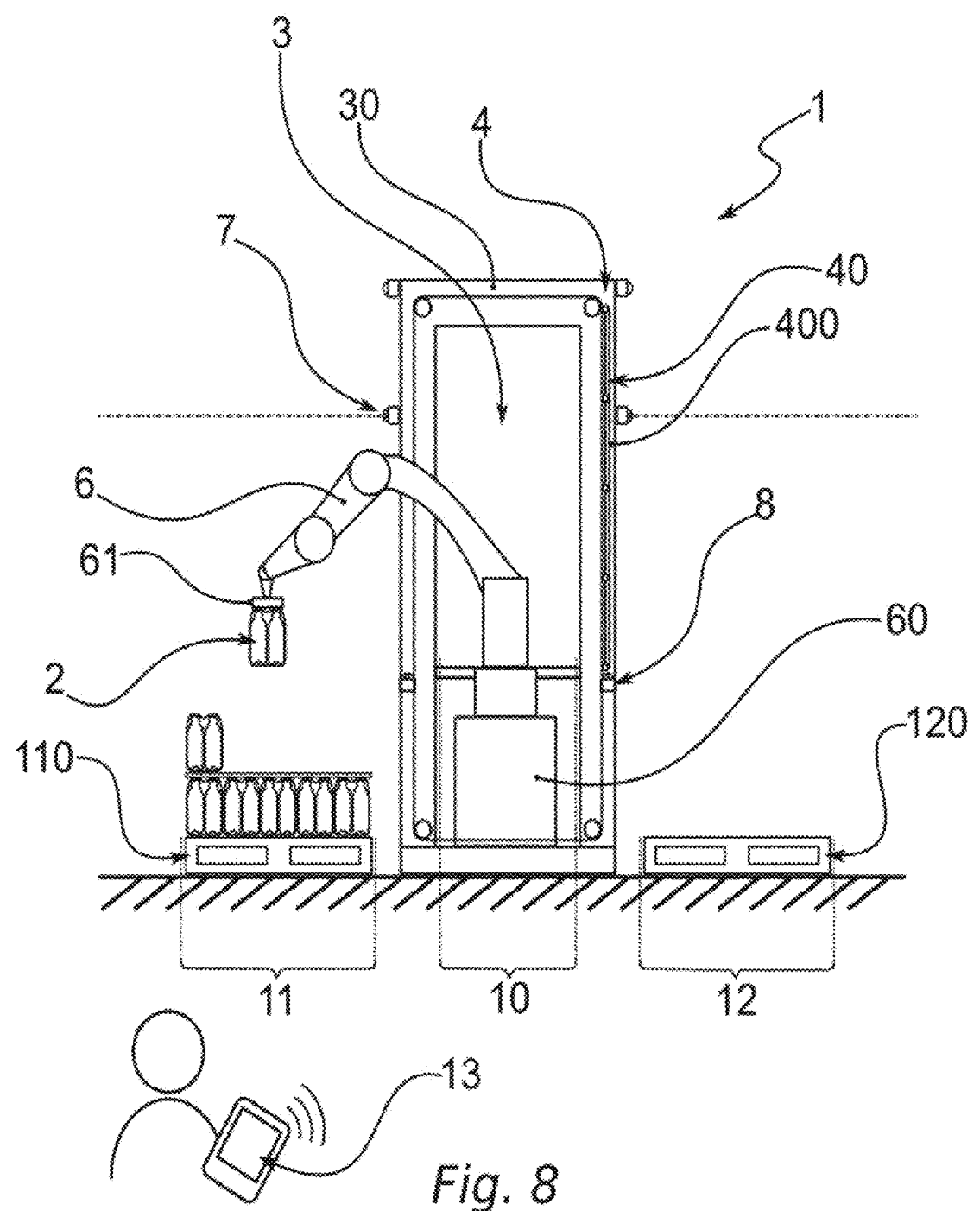
FIG. 8 is a schematic view similar to FIG. 7, with the separating wall in said second position, notably showing the robotic arm in a deployed position.

FIG. 8 is a schematic view similar to FIG. 7, with the separating wall 4 in the second position, between the workstation 3 and the second depositing zone 12, showing the gripping means 61 of the robot 6 in the deployed position.

According to another possible feature, illustrated in FIG. 8, the facility 1 comprises detection means 7. The detection means 7 are connected to a central control unit 13, shown here as a mobile unit, and enable the filling rate of a pallet 110, 120 to be determined. In the embodiment illustrated in FIG. 8, the detection means 7 are visual camera means. When the desired filling rate of a pallet 110, 120 is reached, a signal is emitted. It may be an audible, visual signal, for example. It may also be a message sent to an operator via a mobile device, such as a cell phone for example. Once the operator has been informed that the filling of the pallet 110, 120 is complete, said operator can then manually trigger the movement of the separating wall 4 to secure access to the depositing zone 11, 12. In certain embodiments, and notably where the workstation 3 comprises a robot 6, the operator can also manually trigger the folding of the robot 6 and of the gripping means 61 thereof under the upper face 32 of the structure 30, to allow the wall 4 to move from a first position to the second position.

According to an additional feature, the signal emitted by the detection means 7 is sent to a central control unit 13 which then automatically triggers the movement of the separating wall 4. Where the robot 6 has to fold under the upper face 32 of the structure, the automatic or manual triggering of the change of position of the wall 4 causes the immediate folding of said robot 6 and of the gripping means 61 thereof, followed by the movement of the separating wall 4. These actions can be managed automatically by the central control unit 13.

As shown in FIG. 1, or in FIG. 3, the central control unit 13 can be located directly at the workstation 3. It can also be located remotely, as shown in FIG. 8. In addition, the central unit 13 can be static or mobile.

According to a possible additional feature, the facility 1 comprises a set of safety sensors 8. This embodiment is illustrated in FIG. 8. The safety sensors 8 are used to detect the presence of the separating wall 4 at least in the first and second positions. Thus, in this embodiment, the workstation 3 remains stopped until the wall 4 has reached the desired position. If necessary, the robot 6 and the gripping means 61 thereof can then be deployed.

The safety sensors 8 can also be connected to the central control unit 13. According to another variant, the facility 1 comprises presence sensors (not shown) for detecting the presence of an operator in the vicinity of a depositing zone being used for palletizing. These sensors are known as "anti-intrusion" sensors. In this case, the signal is sent directly to the operator by audio or visual means, or to the central control unit 13, which then triggers the stoppage of the workstation 3. Audible and/or visual signals can be associated with this stoppage, as can automatic notifications on an operator's mobile device.

The invention also relates to a palletizing method for a facility 1 having a picking zone 10 and two depositing zones 11, 12. The method comprises at least one step of picking products 2 to be palletized from a picking zone 10 and a step of unloading said products 2 onto a depositing zone 11, 12, executed by a workstation 3.

The method is characterized in that it comprises a step of securing a first depositing zone 11 by means of a separating wall 4 when a first pallet 110 located in said depositing zone 11 reaches a desired filling level, to enable products 2 to be deposited on a second pallet 120 located in a second depositing zone 12.

In other words, the method comprises a step that guarantees safe access to a depositing zone 11, 12 in which a workstation 3 no longer has to operate. The workstation 3 can continue processing the products 2 in the other depositing zone. The workstation 3 then forms a working zone with the picking zone 10 and the depositing zone 11, 12 being used for palletizing, while the first depositing zone is secured and therefore accessible.

According to an additional feature, the palletization in the second depositing zone 12 only starts once a signal relating to the correct positioning of the separating wall 4 has been triggered. This can be a manual or automatic signal, triggered by safety sensors 8. For example, it may be a contactbased safety sensor 8, which therefore generates a signal when the separating wall 4 reaches its position. In other words, when the safety sensor 8 emits a signal confirming that the separating wall 4 is in the correct position, the control unit 13 confirms that an operator can collect a pallet 110, 120 from the previously secured zone 11, 12.

The palletizing sequences implemented by such a method when the workstation 3 comprises a robot 6 provided with gripping means 61 are described below.

In this case, the method comprises at least one step of picking products 2 to be palletized from a picking zone 10 using gripping means 61 of a robot 6, said robot 6 forming part of a workstation 3.

Firstly, the gripping means 61 of the robot 6 pick the products 2 from the picking zone 10. Said gripping means 61 then deposit said products 2 in a first depositing zone 11. In this case, the separating wall 4 is located between the workstation 3 and the second depositing zone 12. This first step is illustrated in FIG. 8, showing the robot 6 in the deployed position.

Then, when the pallet 110 located in the first depositing zone 11 is full, or once it has reached the desired filling level, the robot 6 and the gripping means 61 thereof are folded under the upper face 32 of the structure 30. The movement of the wall 4 is then initiated. The wall 4 moves from the first position thereof to the second position thereof, passing above the robot 6, over the upper face 32 of the structure 30.

When said wall 4 reaches the second position thereof, between the workstation 3 and the first depositing zone 11, the robot 6 and the gripping means 61 thereof are deployed. The gripping means 6 then pick the products 2 from the picking zone 10 and deposit them on a pallet 120 in the second depositing zone 12.

An operator can collect the pallet 11 from the first depositing zone 11, which is accessible in complete safety.

The palletization facility 1 according to the invention and the method associated thereto therefore ensure the complete and total safety of the facility, while optimizing the working time and therefore the efficiency of the workstation 3. Moreover, the proposed solution is extremely compact and low-cost.

This compactness is notably related to the fact that the workstation 3 is positioned between the two depositing zones 11, 12 so as to be aligned therewith in a direction D, as shown in FIG. 4. In other words, the workstation 3 is located in the space separating two depositing zones 11, 12. Thus, the depositing zones 11, 12 are separated from each other by the workstation 3.

Preferably, in some embodiments, the direction D is substantially perpendicular to the feed conveyor 9, in other words to the feed direction of the products 2 into the picking zone 10. The palletization facility 1 comprises a first depositing zone 11, a workstation 3 and a second depositing zone 12, arranged one after the other in this order in a direction D, as shown in FIG. 4. This configuration, illustrated in FIG. 4, provides a facility 1 operating in an extremely compact and secured manner with two palletizing zones, formed by the two depositing zones 11, 12.

The invention claimed is:

1. A facility for palletizing products, said facility comprising:
   a picking zone for picking said products; two depositing zones for depositing products on pallets; and
   a workstation;
      wherein the workstation is located between the two depositing zones, and wherein the facility further comprises a separating wall that is moveable between at least two positions: a first position between said workstation and the first depositing zone and a second position between said workstation and the second depositing zone, so as to alternately separate one of the two depositing zones from said workstation, wherein the workstation comprises:

a robot provided with gripping means, said gripping means picking the products from said picking zone and discharging them into one of the two depositing zones;

a structure having a lower face, an upper face and two side faces, the robot being fastened directly or indirectly to said structure and the separating wall being movable along said structure, wherein the structure is configured to receive the robot in a folded position and comprises guide rails for the separating wall, said rails extending over the upper face of said structure above the robot and along the side faces so that, when said robot is in the folded position, said separating wall can be moved along said rails between the first position and the second position; and wherein the facility further comprises a detection means for determining a filling level of a pallet and triggering folding of the robot into the structure and movement of the separating wall from one position to another.

2. The facility as claimed in claim 1, wherein the facility comprises an enclosure surrounding the picking zone, the workstation and the depositing zones, wherein said enclosure comprises an entrance for each depositing zone and an opening for supplying the picking zone.

3. The facility as claimed in claim 1, further comprising safety sensors which detect a presence of the separating wall in the first position and in the second position.

4. The facility as claimed in claim 1, wherein the separating wall is a curtain.

5. The facility as claimed in claim 4, wherein the curtain comprises slats.

6. The facility as claimed in claim 4, wherein the curtain comprises at least one transparent slat.

7. A palletizing method for a facility having a picking zone and two depositing zones, said method comprising the following steps:

first picking products to be palletized from a picking zone, executed by a workstation, then unloading said products onto a pallet, wherein the method further comprises a step of moving a separating wall from a first depositing zone when a first pallet located in said first zone reaches a predetermined filling level, to enable products to be deposited on a second pallet located in a second depositing zone, wherein the step of picking and unloading the products is carried out using gripping means of a robot of said workstation, the robot being fastened directly or indirectly to a structure and the separating wall being movable along said structure, wherein the structure is configured to receive the robot in a folded position and comprises guide rails for the separating wall, said rails extending over an upper face of said structure above the robot and along side faces of said structure;

the method further comprising moving the separating wall along said rails between a first position between said workstation and the first depositing zone and a second position between said workstation and the second depositing zone when the robot is in the folded position; and determining a filling level of a pallet and triggering folding of the robot into the structure and movement of the separating wall from the first position to the second position and vice versa.

8. The method as claimed in claim 7, wherein the palletization in the second zone only starts once a signal relating to a correct positioning of the separating wall has been triggered.

* * * * *